US011919592B2

(12) United States Patent
Davis et al.

(10) Patent No.: US 11,919,592 B2
(45) Date of Patent: Mar. 5, 2024

(54) DEVICES FOR RETAINING A BICYCLE CHAIN ON A SPROCKET

(71) Applicant: Dive Xtras Inc., Everett, WA (US)

(72) Inventors: James Alexander Davis, Brier, WA (US); Benjamin McGeever, Shoreline, WA (US); David P. Heiss, Mukilteo, WA (US)

(73) Assignee: Dive Xtras Inc., Everett, WA (US)

( * ) Notice: Subject to any disclaimer, the term of this patent is extended or adjusted under 35 U.S.C. 154(b) by 0 days.

(21) Appl. No.: 17/849,913

(22) Filed: Jun. 27, 2022

(65) Prior Publication Data

US 2023/0010468 A1  Jan. 12, 2023

Related U.S. Application Data (60) Provisional application No. 63/219,774, filed on Jul. 8, 2021.

(51) Int. Cl.
*B62J 13/00* (2006.01)
*B62M 9/00* (2006.01)

(52) U.S. Cl.
CPC .............. *B62J 13/00* (2013.01); *B62M 9/00* (2013.01); *B62M 2009/007* (2013.01)

(58) Field of Classification Search
CPC .. B62J 13/00; B62J 13/04; B62J 13/02; F16H 7/18; B62M 2009/007; B62M 9/136; B62K 19/44

(Continued)

(56) References Cited

U.S. PATENT DOCUMENTS 504,121 A * 8/1893 Cheesman ................ F16H 7/18
                                                    474/144
513,864 A * 1/1894 Bate ........................ B62J 13/00
                                                    474/147

(Continued)

OTHER PUBLICATIONS

E*thirteen LG1 Race Carbon Chainguide, located online on the Internet Archive Wayback Machine dated Sep. 24, 2020 at: http://ethirteen.com/collections/all-chainguides/products/lg1-race-chainguide, 2 pages.

(Continued)

*Primary Examiner* — Henry Y Liu
(74) *Attorney, Agent, or Firm* — Merchant and Gould, PC (57) ABSTRACT

A device for retaining a bicycle chain on a sprocket includes a base plate defining a plurality of fastener openings centered on an origin. A center of each of the plurality of fastener openings is disposed at a first radial distance from the origin. The origin defines an axis extending substantially orthogonally from a plane defined by two lines extending from the origin and at least two centers of the centers of the plurality of fastener openings. A first guard is secured to the base plate and includes a first guard retaining surface including a first curved surface defined by a second radial distance from the axis that is greater than the first radial distance and a first guard guiding surface having a first end adjacent the first guard retaining surface and a second end distal from the first end. The first end is disposed at the second radial distance from the axis. The second end is disposed at a third radial distance from the axis. The third radial distance is greater than the second radial distance. A second guard is secured to the base plate and includes a second guard retaining surface including a second curved surface defined by the second radial distance from the axis. A second guard guiding surface has a first end adjacent the second guard retaining surface and a second end distal from (Continued)

the first end. The first end is disposed at the second radial distance from the axis. The second end is disposed at a fourth radial distance from the axis. The fourth radial distance is greater than the second radial distance.

20 Claims, 9 Drawing Sheets (58) Field of Classification Search
USPC .................................................. 474/140, 144
See application file for complete search history.

(56) References Cited

U.S. PATENT DOCUMENTS

| | | | | | |
|---|---|---|---|---|---|
| 557,181 | A | * | 3/1896 | Billingsley | F16H 7/18 474/144 |
| 582,096 | A | * | 5/1897 | Rominger | B62J 13/02 474/144 |
| 583,904 | A | * | 6/1897 | Hill | B62J 13/00 474/147 |
| 596,616 | A | * | 1/1898 | Pierce | B62J 13/00 474/147 |
| 607,786 | A | * | 7/1898 | Whitney | B62J 13/00 474/147 |
| 610,313 | A | * | 9/1898 | Waters | B62J 13/00 474/147 |
| 655,316 | A | * | 8/1900 | Welch | B62J 15/00 474/144 |
| 659,235 | A | * | 10/1900 | Jeffery | B62J 13/04 474/147 |
| 877,820 | A | * | 1/1908 | Badger | F16H 7/18 74/609 |
| 1,636,327 | A | * | 7/1927 | Roe | B62J 13/00 474/144 |
| 4,054,063 | A | * | 10/1977 | Perrin | B62J 13/00 474/147 |
| 4,240,303 | A | * | 12/1980 | Mosley | F16H 57/04 474/151 |
| 4,515,386 | A | * | 5/1985 | Tsujimura | B62J 13/00 280/304.3 |
| 5,312,303 | A | * | 5/1994 | Hinschlager | B62J 13/04 474/146 |
| 5,460,576 | A | * | 10/1995 | Barnett | B62M 9/136 474/140 |
| 5,725,450 | A | * | 3/1998 | Huskey | B62M 9/16 474/134 |
| 6,165,092 | A | * | 12/2000 | Bramham | B62M 9/16 474/134 |
| 6,354,973 | B1 | * | 3/2002 | Barnett | B62J 13/00 474/140 |
| 6,443,865 | B1 | * | 9/2002 | Yamanaka | B62M 9/105 474/144 |
| 6,533,690 | B2 | * | 3/2003 | Barnett | B62M 9/138 474/140 |
| 7,066,856 | B1 | * | 6/2006 | Rogers | B62J 23/00 474/144 |
| RE42,436 | E | * | 6/2011 | Rogers | B62J 23/00 474/144 |
| 8,235,849 | B2 | * | 8/2012 | Cranston | B62J 13/00 280/727 |
| 8,961,342 | B2 | * | 2/2015 | Emura | B62M 9/136 474/140 |
| 8,979,685 | B2 | * | 3/2015 | Weagle | B62J 13/00 474/144 |
| 9,249,867 | B2 | * | 2/2016 | Graziosi | F16H 7/18 |
| 9,327,786 | B2 | * | 5/2016 | Cranston | B62J 13/00 |
| 10,053,188 | B2 | * | 8/2018 | Staples | B62M 9/121 |
| 10,464,635 | B2 | * | 11/2019 | Pfeiffer | B62J 13/00 |
| 11,492,060 | B2 | * | 11/2022 | Carlier | B62J 13/04 |
| 11,524,746 | B2 | * | 12/2022 | Barefoot | B62M 9/00 |
| 11,613,326 | B2 | * | 3/2023 | Barefoot | B62M 9/00 474/140 |
| 2002/0160869 | A1 | * | 10/2002 | Barnett | B62M 9/138 474/144 |
| 2003/0060316 | A1 | * | 3/2003 | Jiang | B62M 9/16 74/134 |
| 2004/0009835 | A1 | * | 1/2004 | Heim | B62M 9/138 474/199 |
| 2006/0046883 | A1 | * | 3/2006 | Nishimoto | B62J 13/02 474/144 |
| 2006/0058139 | A1 | * | 3/2006 | Fry | B62J 13/00 474/144 |
| 2007/0013162 | A1 | * | 1/2007 | Whyte | B62K 15/008 280/278 |
| 2007/0235986 | A1 | * | 10/2007 | Weagle | B62J 23/00 280/727 |
| 2008/0032835 | A1 | * | 2/2008 | Reynolds | B62M 9/136 474/80 |
| 2008/0293528 | A1 | * | 11/2008 | Paull | B62J 13/00 474/144 |
| 2009/0062049 | A1 | * | 3/2009 | Cranston | B62J 13/00 474/144 |
| 2009/0220319 | A1 | * | 9/2009 | Weagle | B62M 9/126 411/103 |
| 2010/0317475 | A1 | * | 12/2010 | Talavasek | B62M 9/136 74/594.1 |
| 2012/0142469 | A1 | * | 6/2012 | Barefoot | B62J 23/00 474/139 |
| 2013/0053195 | A1 | * | 2/2013 | Emura | B62M 9/16 474/140 |
| 2013/0053196 | A1 | * | 2/2013 | Emura | B62M 9/136 474/140 |
| 2013/0217527 | A1 | * | 8/2013 | Graziosi | B62M 9/16 474/140 |
| 2014/0051535 | A1 | * | 2/2014 | Cranston | B62J 13/00 474/140 |
| 2016/0265633 | A1 | * | 9/2016 | Miles | B62M 9/136 |
| 2017/0045121 | A1 | * | 2/2017 | Staples | B62M 9/121 |
| 2018/0022418 | A1 | * | 1/2018 | Pfeiffer | F16H 7/18 474/140 |
| 2019/0127023 | A1 | * | 5/2019 | Fujimoto | B62M 9/126 |
| 2020/0047837 | A1 | * | 2/2020 | Carlier | F16H 7/18 |
| 2020/0324858 | A1 | * | 10/2020 | Barefoot | B62M 9/00 |
| 2020/0331558 | A1 | * | 10/2020 | Charette | B62M 9/16 |
| 2022/0033033 | A1 | * | 2/2022 | Barefoot | B62M 9/00 |

OTHER PUBLICATIONS

E*thirteen TRS Race SL, located online on the Internet Archive Wayback Machine dated Sep. 24, 2020 at: http://ethirteen.com/collections/all-chainguides/products/trs-racw-cmpct-i05-no-bash, 2 pages.
Oneup Chain Guide—ISCG05—v2, located online on Feb. 3, 2023, at: https://www.oneupcomponents.com/collections/chainguide/products/chain-guide-iscg05-v2, 3 pages.

* cited by examiner

DEVICES FOR RETAINING A BICYCLE CHAIN ON A SPROCKET

CROSS-REFERENCE TO RELATED APPLICATIONS

This application claims priority to and the benefit of U.S. Provisional Patent Application Ser. No. 63/219,774, filed Jul. 8, 2021, and entitled "Device for Retaining Bicycle Chains," the disclosure of which is hereby incorporated by reference herein in its entirety.

INTRODUCTION

Many bicycles include at least two wheels, a chain drive system, and suspension. The chain drive system includes multiple drive sprockets axially mounted with the rear wheel, a single front drive sprocket with cranks and pedals, a connecting chain, and a derailleur mechanism to selectively move the chain between the multiple rear wheel drive sprockets. The rear wheel is often attached to the bicycle via the suspension system that allows the rear wheel to move between an upper and lower position.

SUMMARY

In one aspect, the technology relates to a device for retaining a bicycle chain on a sprocket, the device includes: a base plate defining a plurality of fastener openings centered on an origin, wherein a center of each of the plurality of fastener openings is disposed at a first radial distance from the origin, and wherein the origin defines an axis extending substantially orthogonally from a plane defined by two lines extending from the origin and at least two centers of the centers of the plurality of fastener openings; a first guard secured to the base plate and including: a first guard retaining surface including a first curved surface defined by a second radial distance from the axis that is greater than the first radial distance; and a first guard guiding surface having a first end adjacent the first guard retaining surface and a second end distal from the first end, wherein the first end is disposed at the second radial distance from the axis, and wherein the second end is disposed at a third radial distance from the axis, wherein the third radial distance is greater than the second radial distance; and a second guard secured to the base plate and including: a second guard retaining surface including a second curved surface defined by the second radial distance from the axis; and a second guard guiding surface having a first end adjacent the second guard retaining surface and a second end distal from the first end, wherein the first end is disposed at the second radial distance from the axis, and wherein the second end is disposed at a fourth radial distance from the axis, wherein the fourth radial distance is greater than the second radial distance. In an example, the first guard retaining surface and the second guard retaining surface extend from a first side of the plane, and wherein the device further includes a spacer plate secured to the base plate on a second side of the plane. In another example, the first guard includes a first guard length defined by a length of the first guard retaining surface and a length of the first guard guiding surface, wherein the first guard length is greater than a width of either of the first guard retaining surface and the first guard guiding surface. In yet another example, the length of the first guard retaining surface and the length of the first guard guiding surface are each greater than the width of either of the first guard retaining surface and the first guard guiding surface. In still another example, the second guard includes a second guard length defined by a length of the second guard retaining surface and a length of the second guard guiding surface, wherein the second guard length is greater than a width of either of the second guard retaining surface and the second guard guiding surface.

In another example of the above aspect, the length of the second guard retaining surface and the length of the second guard guiding surface are each greater than the width of either of the second guard retaining surface and the second guard guiding surface. In an example, the second guard length is greater than the first guard length. In another example, the base plate includes a first arm, and wherein the first guard is secured to the first arm, and wherein a distance of a terminus of the first arm from the origin is greater than the second radial distance. In yet another example, the device further includes a chain guard including the second guard and secured to the base plate at a chain guard distance less than the second radial distance. In still another example, the base plate is a substantially d-shaped part.

In another example of the above aspect, the base plate is substantially J-shaped unitary part. In an example, the base plate includes a first spanning portion between a first opening and a second opening of the plurality of fastener openings, a second spanning portion between the second opening and a third opening of the plurality of fastener openings, and a gap between the third opening and the first opening of the plurality of fastener openings. In another example, the base plate is metal and wherein the first guard and the second guard are at least partially plastic. In yet another example, the second guard is manufactured of a material having a higher impact strength than a material of the first guard. In still another example, the chain guard includes a sidewall disposed substantially orthogonal to the second guard retaining surface and a chain exit chamfer surface disposed at an angle to the sidewall.

In another example of the above aspect, the first guard is disposed entirely on a first side of the plane and wherein the chain guard is disposed on the first side of the plane and a second side of the plane. In an example, the width of the first guard guiding surface is greater than a width of the second guard guiding surface. In another example, the first guard guiding surface and the second guard guiding surface are substantially flat. In yet another example, the first guard retaining surface includes a first angular arc length and wherein the second guard retaining surface includes a second angular arc length greater than the first angular arc length. In still another example, a bicycle includes the device.

In another aspect, the technology relates to a device for retaining a bicycle chain on a sprocket, the device includes: a base plate defining a plurality of fastener openings centered on an origin, wherein a center of each of the plurality of fastener openings is disposed at a first radial distance from the origin, and wherein the origin defines an axis extending substantially orthogonally from a plane defined by two lines extending from the origin and at least two centers of the centers of the plurality of fastener openings; and a first guard secured to the base plate and including: a first guard retaining surface including a first curved surface defined by a second radial distance from the axis that is greater than the first radial distance; and a first guard guiding surface having a first end adjacent the first guard retaining surface and a second end distal from the first end, wherein the first end is disposed at the second radial distance from the axis, and wherein the second end is disposed at a third radial distance from the axis, wherein the third radial distance is greater than the second radial distance.

In another aspect, the technology relates to a device for retaining a bicycle chain on a sprocket, the device includes: a base plate defining a plurality of fastener openings centered on an origin, wherein a center of each of the plurality of fastener openings is disposed at a first radial distance from the origin, and wherein the origin defines an axis extending substantially orthogonally from a plane defined by two lines extending from the origin and at least two centers of the centers of the plurality of fastener openings; and a second guard secured to the base plate and including: a second guard retaining surface including a second curved surface defined by a second radial distance from the axis that is greater than the first radial distance; and a second guard guiding surface having a first end adjacent the second guard retaining surface and a second end distal from the first end, wherein the first end is disposed at the second radial distance from the axis, and wherein the second end is disposed at a fourth radial distance from the axis, wherein the fourth radial distance is greater than the second radial distance.

BRIEF DESCRIPTION OF THE DRAWINGS

The following drawing figures, which form a part of this application, are illustrative of described technology and are not meant to limit the scope of the disclosure as claimed in any manner, which scope shall be based on the claims appended hereto.

DETAILED DESCRIPTION

The technologies described herein include a device or system of components that is intended to keep the chain of the bicycle engaged with the front drive sprocket whilst the bicycle is ridden over uneven terrain, subjecting the bike to shocks and vibrations in various directions, which might otherwise cause the chain to become disengaged. The device also protects the front drive sprocket from impact with objects the bike may pass over. A number of particular examples are described herein, some of which include components to primarily protect the front drive sprocket, some of which include components to primarily retain the chain on the sprocket. Still other examples include technologies that perform both functions.

Figure 1:
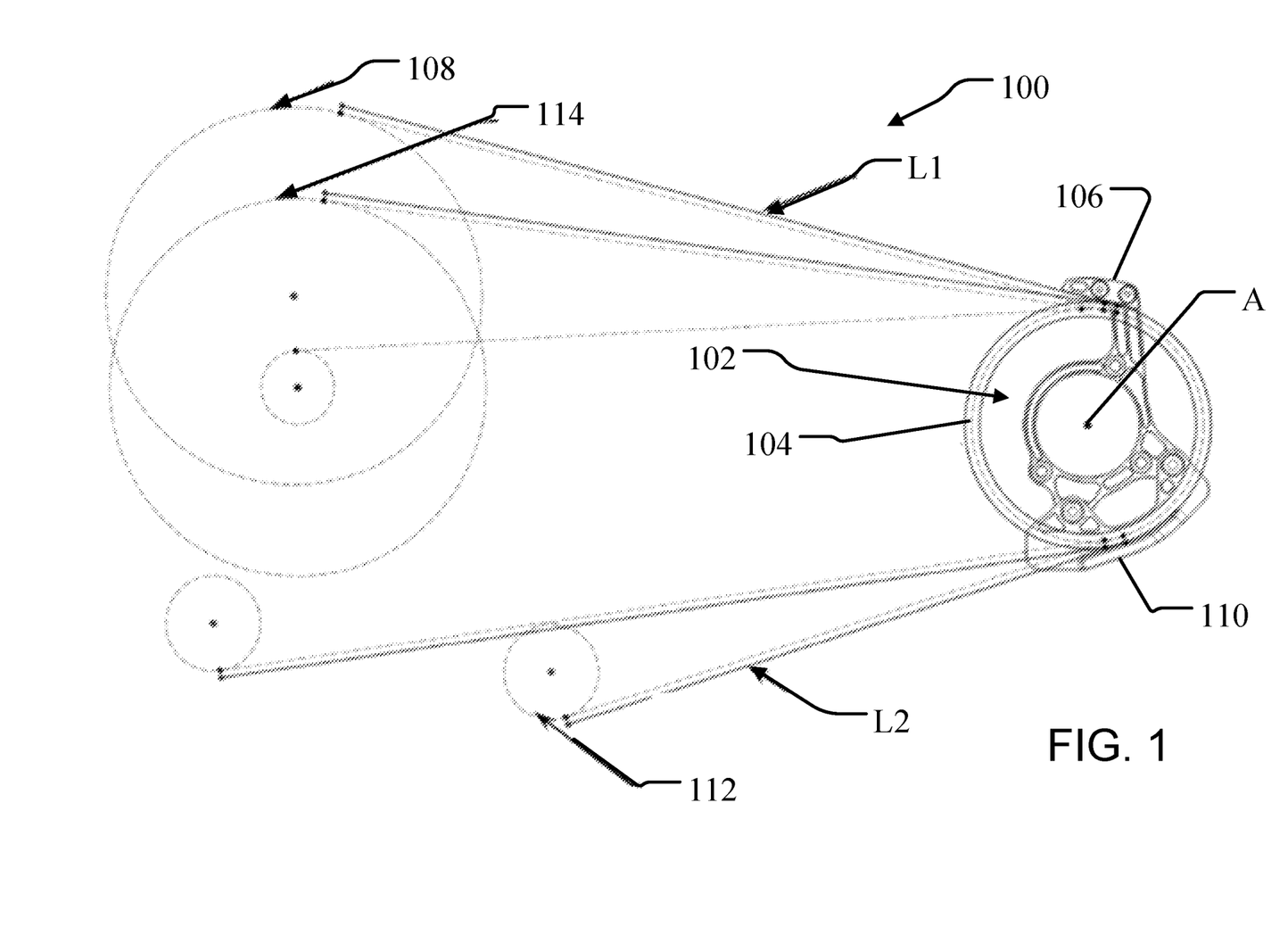
FIG. 1 depicts a partial schematic view of a chain drive system for a bicycle, illustrating chain range of motion during use.

FIG. 1 depicts a partial schematic view of a chain drive system 100 for a bicycle, illustrating chain range of motion during use. Not all components described below are labeled in FIG. 1; rather, FIG. 1 is depicted to explain the general functional operation of the devices described herein. In an example, a retention device or assembly 102 may include a base plate that may be secured to the bicycle frame with one or more fasteners that are aligned in a direction parallel to the axis A of the front drive sprocket 104. In examples, a spacer plate may be positioned between the base plate and the frame. The spacer plate may be used to accommodate different drive sprocket offsets. A low friction component, which may be manufactured of a polymer or other robust material, is mounted to the base plate in one or more locations. A component mounted as an upper component 106 may include a first face that is parallel to a plane defined by a first line L1 tangent to the front drive sprocket and the largest rear drive sprocket with the suspension at its uppermost pedaling position (the sprocket in this uppermost pedaling position is depicted at 108) and a second line intersecting the first line and parallel with the front drive sprocket axis A. In general, the first face performs the guiding function of the component 106 and has a length parallel to the plane defined by first line L1 and a width parallel to the second line. The uppermost pedaling position may be defined as being between about 20% and about 40% of the total suspension travel. A second face on the upper component performs the retaining function and is substantially cylindrical in nature and concentric to the drive sprocket axis. This cylindrical face extends from where it intersects the flat face up to a point at which it has covered at least one full standard chain link with the suspension at the lower position. When installed, the closest points of the two faces are offset between about 0 mm and about 2.0 mm from the closest point of the chain, when chain is engaged with the front drive sprocket. This helps retain the chain on the sprocket, even during significant chain movement due to suspension travel and/or riding vibrations, though the devices described herein may also be utilized on bicycles that do not utilize suspension (e.g., road bikes) and/or bikes not subject to significant chain vibration (e.g., track bikes ridden indoors).

A component mounted as a lower component 110 may be made of a high strength polymer. The lower component may include a first face that is parallel to a plane defined by a line tangent L2 to the outer diameter of the front drive sprocket and the outer diameter of the sprocket of a derailleur 112 with the chain engaged with the largest rear wheel drive sprocket with the suspension at its lower position (the sprocket in this lower pedaling position is depicted at 112) and a second line intersecting the first line and parallel with the front drive sprocket axis. This first face is defined generally similarly to the first face of the upper component. The lower component also includes a cylindrical face that is concentric to the drive sprocket axis. This cylindrical face extends from the point at which it intersects the flat face up to a point at which it has covered at least one full standard chain link when the suspension is at the lower position. When installed, the closest points of the two faces are offset between about 0 mm and about 2.0 mm from the closest point of the chain, when chain is engaged with the front drive sprocket. An underside of the protecting component forms an impact surface that may be nominally concentric with the front drive sprocket but larger in diameter. This impact surface is positioned such that objects moving towards the front drive sprocket (e.g., rocks or logs being traversed on the bicycle) would first impact that surface and not the drive sprocket or chain. Further, this impact surface may have an angled leading face that deflects impacts to one side.

As the bicycle is ridden over uneven terrain causing motion in the chain, the various faces of the components limit chain motion such that chain disengagement is reduced or eliminated. Further, unlike other chain retention devices available on the market, the technologies described herein do not surround the chains on more than two sides. Existing chain retention devices guide the chains through substantially U-shaped channels. Many bicycles, especially those used in off-road applications (e.g., mountain bikes, cyclecross bikes, or fat bikes), often encounter mud, dirt, or other debris that gets stuck to the chain and that may clog such U-shaped retention systems. By placing guards near only two sides of the chain, such mud and debris may more easily be released from the chain simply by peddling. With these basic principles of operation in mind, the components of a number of devices for retaining chains on a sprocket are described in more detail below.

Figure 2A:
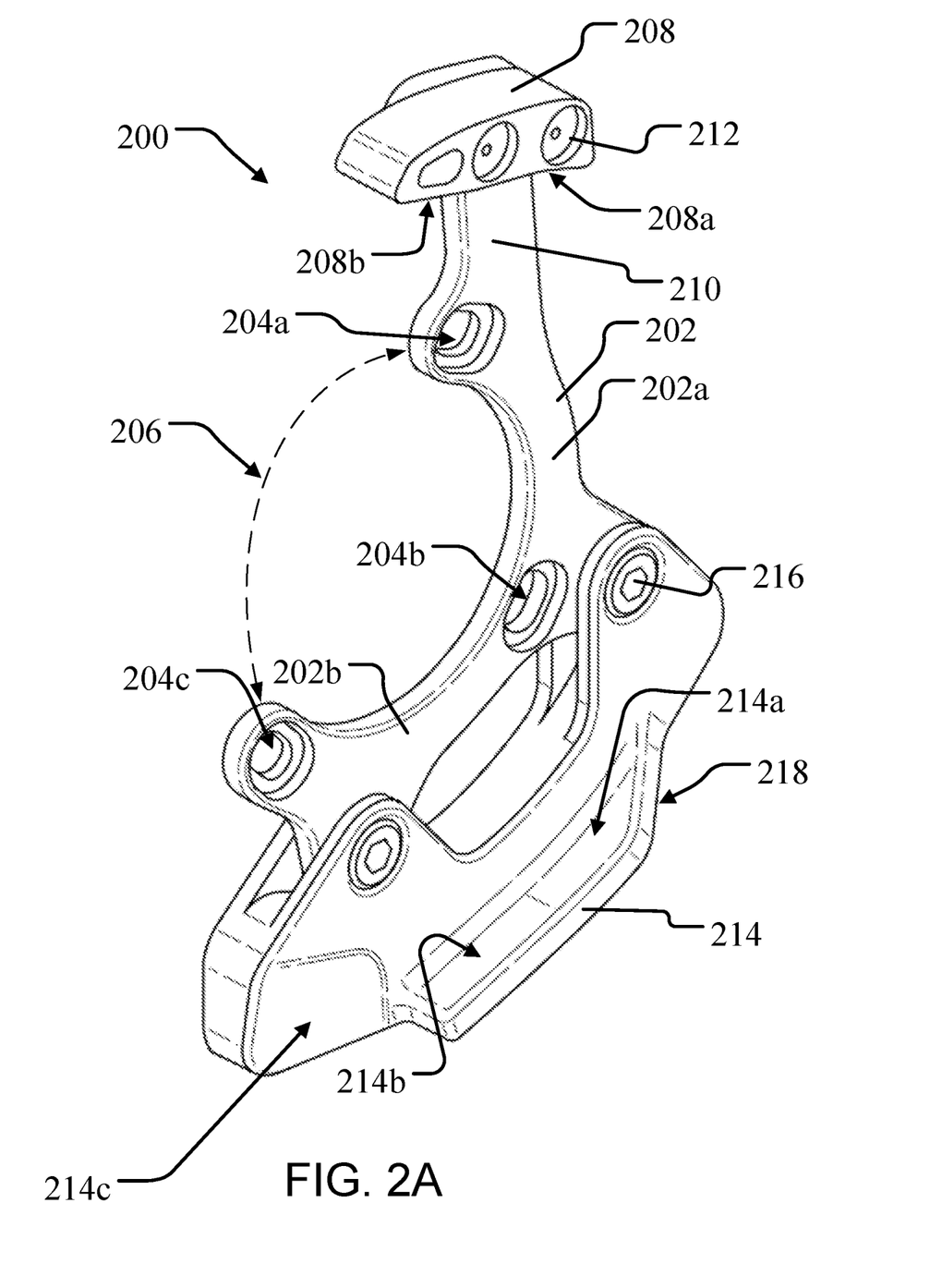
FIGS. 2A and 2B depict perspective and exploded perspective views, respectively, of a device for retaining a chain on a sprocket of a bicycle.
Figure 2B:
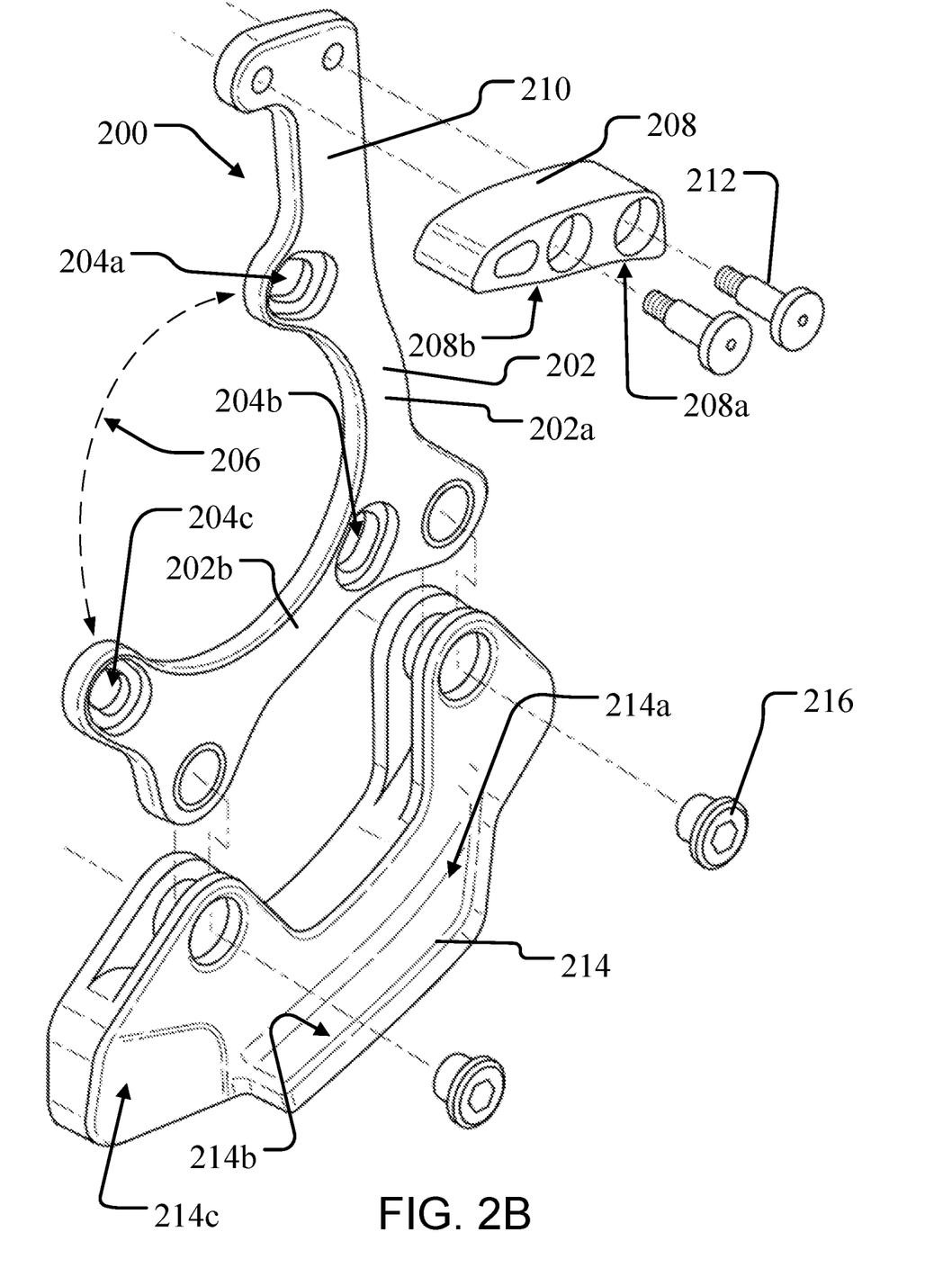

FIGS. 2A and 2B depict perspective and exploded perspective views, respectively, of a device 200 for retaining a chain on a sprocket of a bicycle. FIGS. 2A and 2B are described concurrently and not every component is depicted in each figure. The device 200 includes a base plate 202 that in this case is substantially J-shaped in profile, and substantially planar. For reference purposes, a plane of the base plate 202 may be considered a plane that bisects the component, with mirror image portions of the base plate 202 on either side of the plane. The base plate 202 defines a plurality of fastener openings 204 for receiving a plurality of fasteners for securing the base plate 202 to a frame of a bicycle. The term "J-shaped" may be understood in the context of these fastener openings 204. In the depicted configuration, the base plate 202 includes a first spanning portion 202a between a first opening 204a and a second opening 204b. The base plate 202 also includes a second spanning portion 202b between the second opening 204b and a third opening 204c. Between the first opening 204a and the third opening 204c, however, no plate material is present, and thus a gap 206 is formed, thereby defining the J-shape of the base plate 202. The gap 206 is depicted generally in FIGS. 2A and 2B as the dashed line 206. This is in contrast to the device 100 depicted in FIG. 1, which includes plate material spanning each adjacent fastener opening 204, thus forming a plate having a d-shape. Either configuration is consistent with the teachings herein, though the J-shaped plate 202 of FIGS. 2A-2B may be display installation advantages, in that a technician need not remove the sprocket, cranks, or other components to fix the device 200 to the frame of the bicycle.

A first, upper guard 208 is secured at an end of an arm 210 of the base plate 202 with a plurality of fasteners 212 such as screw or bolts. In this example, the arm 210 defines a furthest extent of the device 200 from the axis A. In other examples, the upper guard 208 may be secured to the base plate 202 with adhesives. Mechanical fasteners may be more desirable, however, in that they enable the upper guard 208 to be removed and replaced if damaged or worn. The upper guard 208 is disposed on a single side of the plane that defines the base plate 202. The upper guard 208 includes two surfaces, a retaining surface 208a, and a guiding surface 208b. The retaining surface 208a is substantially curved along its entire length (in this case, the length of the retaining surface 208a is measured along a direction of travel of a bicycle chain during use, as described in further detail herein). A width of the retaining surface 208a is orthogonal to that direction of chain travel. This curved configuration enables close positioning of the upper guard 208 and a bicycle chain as it travels around a sprocket, thereby reducing or eliminating the possibility of the chain disengaging from the sprocket. The guiding surface 208b is substantially flat along its entire length and width (as length and width are defined above with regard to the retaining surface 208a). In other examples, however, the guiding surface may be curved or slightly curved, e.g., in a direction opposite the direction of curvature of the retaining surface 208a. The flat (or oppositely-curved) configuration of the guiding surface 208b allows the upper guard 208 to guide the chain as it is drawn towards the upper guide surface 208b from the large sprocket at the back wheel, so as to mate efficiently and accurately with the sprocket.

A second, lower guard 214 is secured at a lower side of the base plate 202 with a plurality of fasteners 216 such as screw or bolts. In other examples, the lower guard 214 may be secured to the base plate 202 with adhesives. Mechanical fasteners may be more desirable, however, in that they enable the lower guard 214 to be removed and replaced if damaged or worn. The lower guard 214 is disposed on both sides of the plane that defines the base plate 202. The lower guard 214 includes two surfaces, a retaining surface 214a, and a guiding surface 214b. The retaining surface 214a is substantially curved along its entire length (in this case, the length of the retaining surface 214a is measured along a direction of travel of a bicycle chain during use, as described in further detail herein). A width of the retaining surface 214a is orthogonal to that direction of chain travel. This curved configuration enables close positioning of the lower guard 214 and a bicycle chain as it travels around a sprocket, thereby reducing or eliminating the possibility of the chain disengaging from the sprocket. The guiding surface 214b is substantially flat along its entire length and width (as length and width are defined above with regard to the retaining surface 214a). In other examples, however, the guiding surface 214b may be curved or slightly curved, e.g., in a direction opposite the direction of curvature of the retaining surface 214a. The flat (or oppositely-curved) configuration of the guiding surface 214b allows the lower guard 214 to guide the chain smoothly away from the lower guard 214 towards the rear derailleur. The lower guard 214 also has an angled leading surface 218 so as to deflect objects away from the lower guard 214, which may help reduce impact force of the object against the lower guard 214, which may regularly come into contact with rocks, roots, logs, etc., on a rugged trail. The lower guard 214 also includes a chain exit chamfer surface 214c proximate the guiding surface 214b. As the chain exits the sprocket and travels towards the rear derailleur, the position of the rear derailleur changes position relative to the rear wheel (e.g., the derailleur may be closer to or further from the rear wheel, depending on the cassette chain ring that the chain is being wrapped around. The chain exit chamfer surface 214c allows the chain to exit the sprocket and travel unimpeded towards the rear derailleur, without rubbing against the lower guide 214.

Figure 3A:
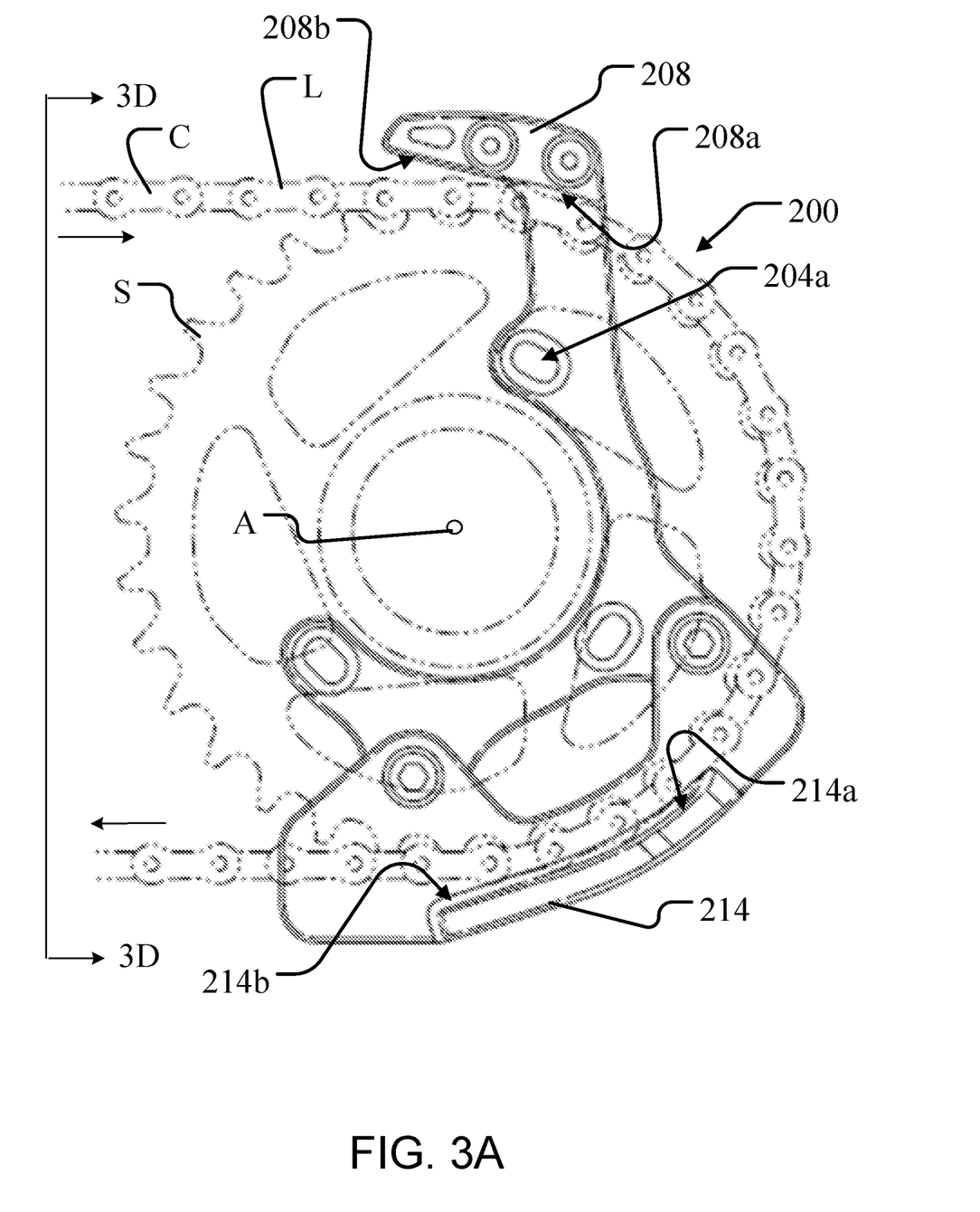
FIG. 3A depicts a side view of a device for retaining a chain on a sprocket of a bicycle.
Figure 3B:
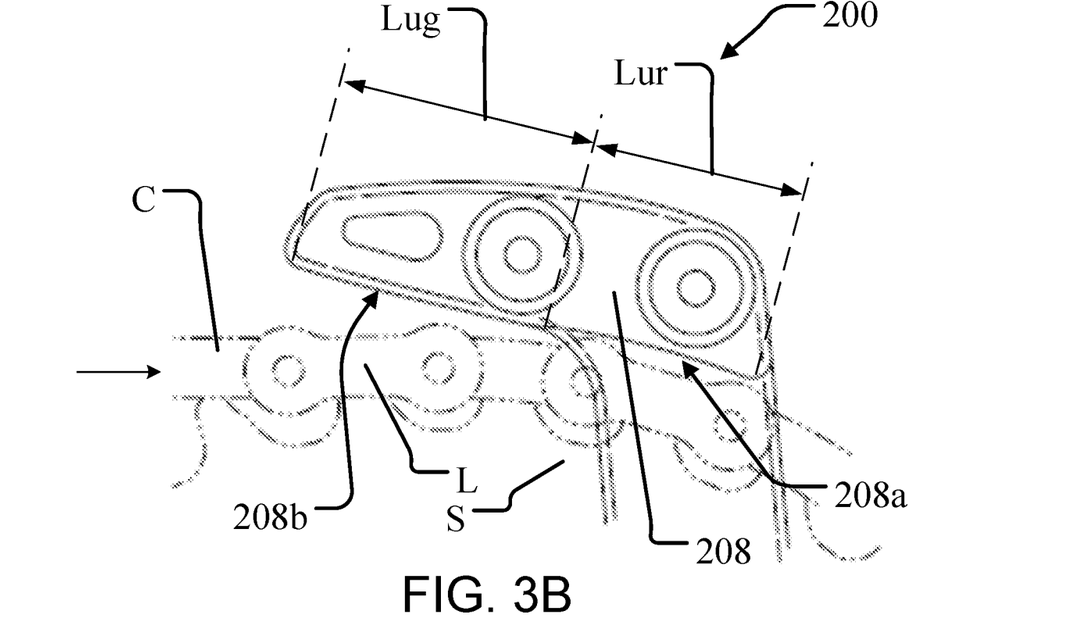
FIGS. 3B-3C depict enlarged partial side views of the device, chain, and sprocket of FIG. 3A.
Figure 3C:
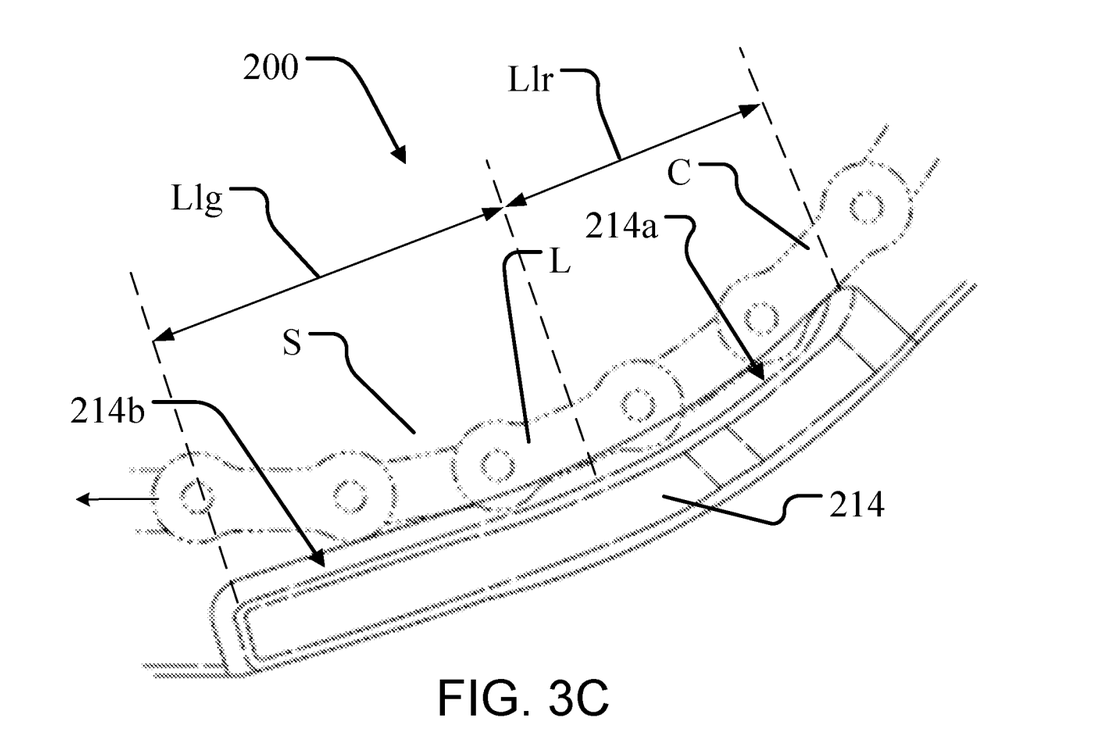

FIG. 3A depicts side views of a device 200 for retaining a chain C on a sprocket S of a bicycle. FIGS. 3B-3C depict enlarged partial side views of the device 300, chain C, and sprocket S of FIG. 3A. FIGS. 3A-3C are described concurrently and not every component is depicted in each figure; further, the chain C and sprocket S are depicted in phantom lines for clarity, and the device 200 is numbered consistently with the device of FIGS. 2A and 2B. The sprocket S rotates about an axis A. During forward pedaling, the sprocket S rotates clockwise, such that individual links L of the chain C engage with the sprocket S proximate an upper guiding surface 208b of an upper guard 208. The individual links L then pass by an upper retaining surface 208a, before passing around the sprocket S, towards a lower retaining surface 214a of a lower guard 214. The chain separates from engagement with the sprocket S proximate the lower guiding surface 214b.

Figure 3D:
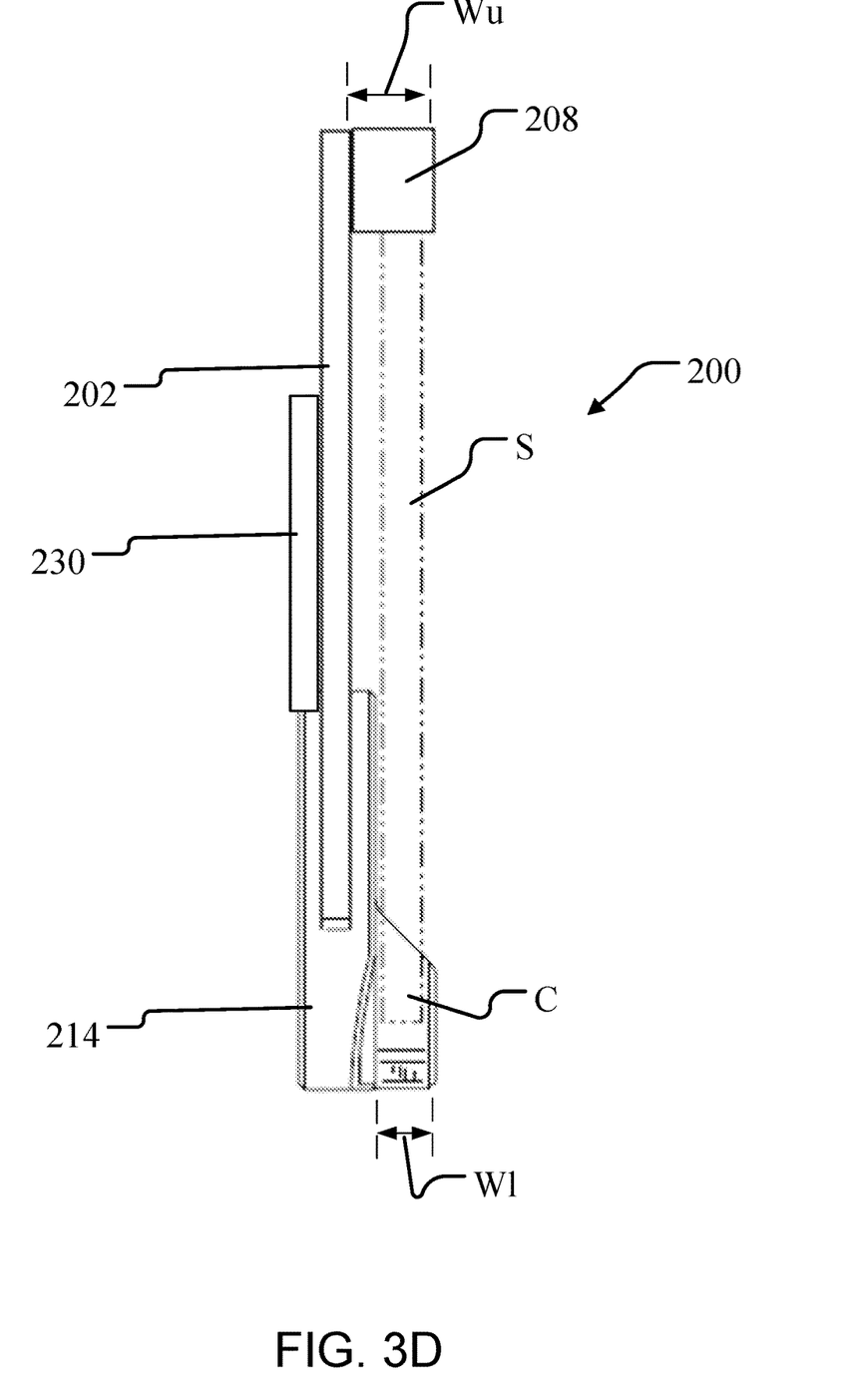
FIG. 3D depicts an edge view of another example of a device for retaining a chain on a sprocket of a bicycle.

FIG. 3D depicts an edge view of the device 200 of FIG. 3A. The guards 208, 214 may be sized as required or desired for a particular application. The surfaces 208a, 208b, 214a, 214b of guards 208, 214 include a width that may be less than, substantially similar to, or greater than a width of a chain, although widths at least as wide as the chain may be more desirable to protect the chain from impact damage (e.g., proximate the lower portion of the sprocket). The width of the upper guard 208 is depicted as Wu, while the width of the lower guard 214 is depicted as Wl. The width Wu is generally greater than the width Wl, owing to the more substantial construction of the lower guide 214, as that component is designed to absorb impact. It has been determined that the chain may more easily shed dirt, mud, and debris if the widths of the various surfaces 208a, 208b, 214a, 214b are sized so as to terminate at a distance substantially coextensive with a side of the chain from the arm 210 (in the case of the upper guard 208) or a sidewall of the lower guard 214. The lengths of the various surfaces 208a, 208b, 214a, 214b, are depicted in FIGS. 3B and 3C and in examples are longer than the width of the same surface, and the term "length" may be a linear length or an arc length, as would be apparent to a person of skill in the art, in the context of particular surface. While the lengths may be as required or desired for a particular application, it has been determined that the chain is more easily retained on the sprocket if the length Lur of the upper retaining surface 208a and the length Llr of the lower retaining surface 214a are at least as long as a single link L of a chain C. This prevents an individual link L from pivoting about a chain pin and disengaging from the sprockets. These lengths Lur and Llr are greater than a width of the corresponding retaining surface 208a, 214a. Lengths Lug and Llg of the guiding surfaces 208b, 214b may be as required or desired for a particular application. In examples, however, lengths Lug and Llg are longer than lengths Lur and Llr in order to provide a guide for the chain C to follow as it approaches or leaves the sprocket S. These longer lengths allow the chain C to smoothly transition towards the point where it is captured between or release from the sprocket S and guide surfaces 208a, 214a, respectively. FIG. 3D also depicts a spacer plate 230, which may be secured to the base plate 202 to space that component further from the frame of the bicycle. FIG. 3D also clearly depicts that certain components (e.g., the upper guard 208 and the spacer plate 230) are disposed on a single side of the base plate 202 (and thus the plane defining the base plate 202), while other components are disposed on both sides of the base plate 202.

Figure 4:
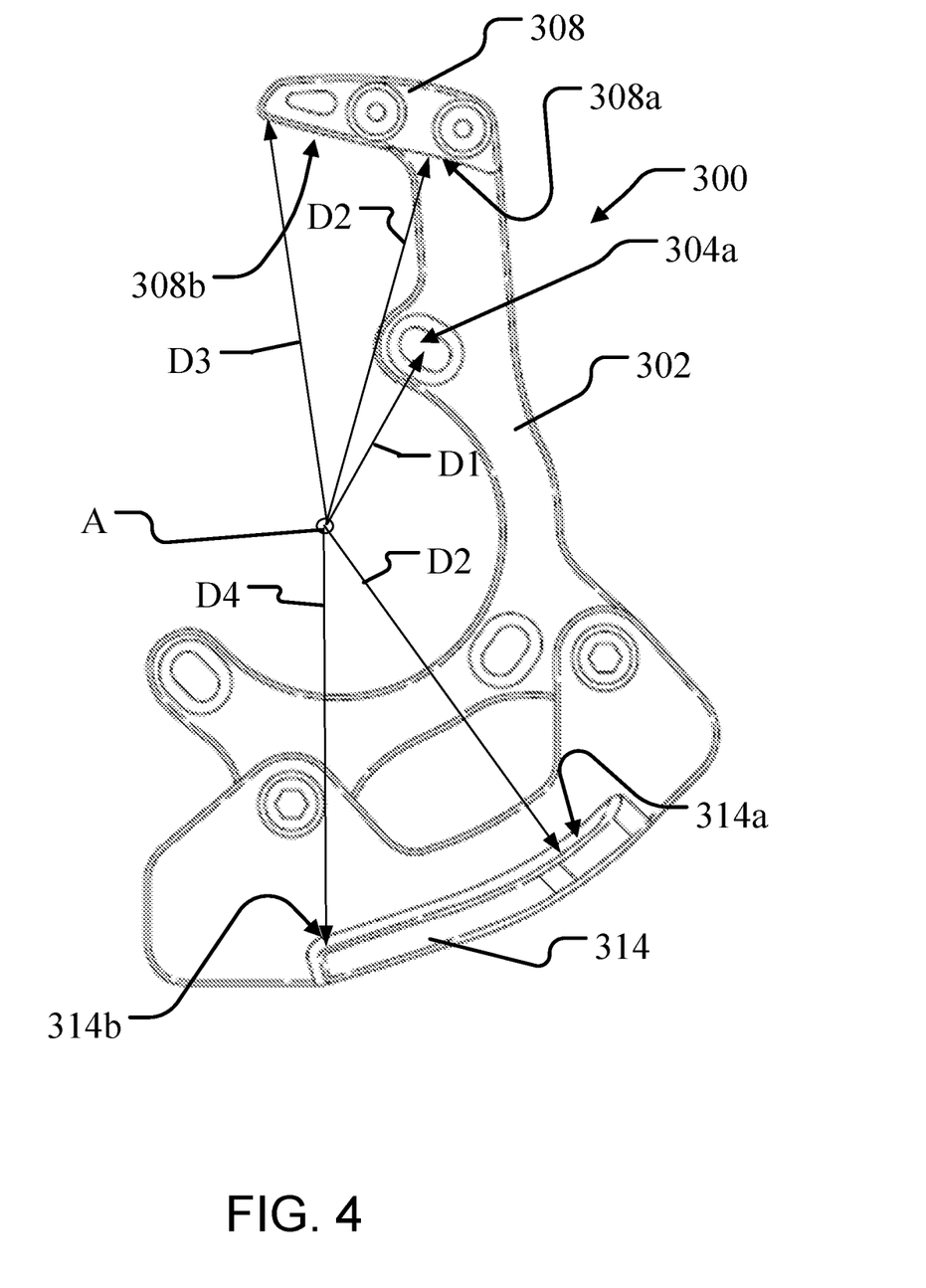
FIG. 4 depicts positional relationships of various components of a device for retaining a chain on a sprocket of a bicycle.

FIG. 4 depicts positional relationships of various components of a device 300 for retaining a chain on a sprocket. Each of the various surfaces 308a, 308b, 314a, and 314b are disposed certain radial distances from the axis A; as such, the axis A acts as an origin for the various distances described herein. At least two lines from the origin to the various components described below may also be used to define the plane described above in the context of the base plate. These distances aid in both retaining the chain on, as well as guiding the chain onto and off of, the sprocket. As noted above, the fastener openings (here represented by fastener opening 304a) are disposed a first radial distance D1 from the axis A, as required to engage the device 300 with a bicycle frame. The retaining surfaces 308a, 314a are disposed a second radial distance D2 (greater than the first radial distance D1) from the axis A. This second radial distance D2 is consistent along substantially the entire length Lur, Llr of the retaining surfaces 308a, 314a, as this maintains tight tolerances with the sprocket, thus retaining the chain thereon. Ends of the guiding surfaces 308b, 314b adjacent the retaining surfaces 308a, 314a are also disposed at the second radial distance D2. However, as the guiding surfaces 308b, 314b extend away from the retaining surfaces 308a, 314a (so as to guide the chain into and out of contact with the sprocket), the distance to the axis A increases. For example, an end of the guiding surface 308b distal from the guiding surface 308a is disposed a third radial distance D3 from the axis A, while an end of the guiding surface 314b distal from the guiding surface 314a is disposed a fourth radial distance D4 from the axis A. Both the third and fourth radial distances D3, D4 are greater than both the first and second radial distances D1, D2, and may, in examples, be equal. The distances D3, D4 are largely dependent on lengths Lug and Llg, as well as the angle from which the extend from the adjacent retaining surfaces 308a, 314a.

Figure 5:
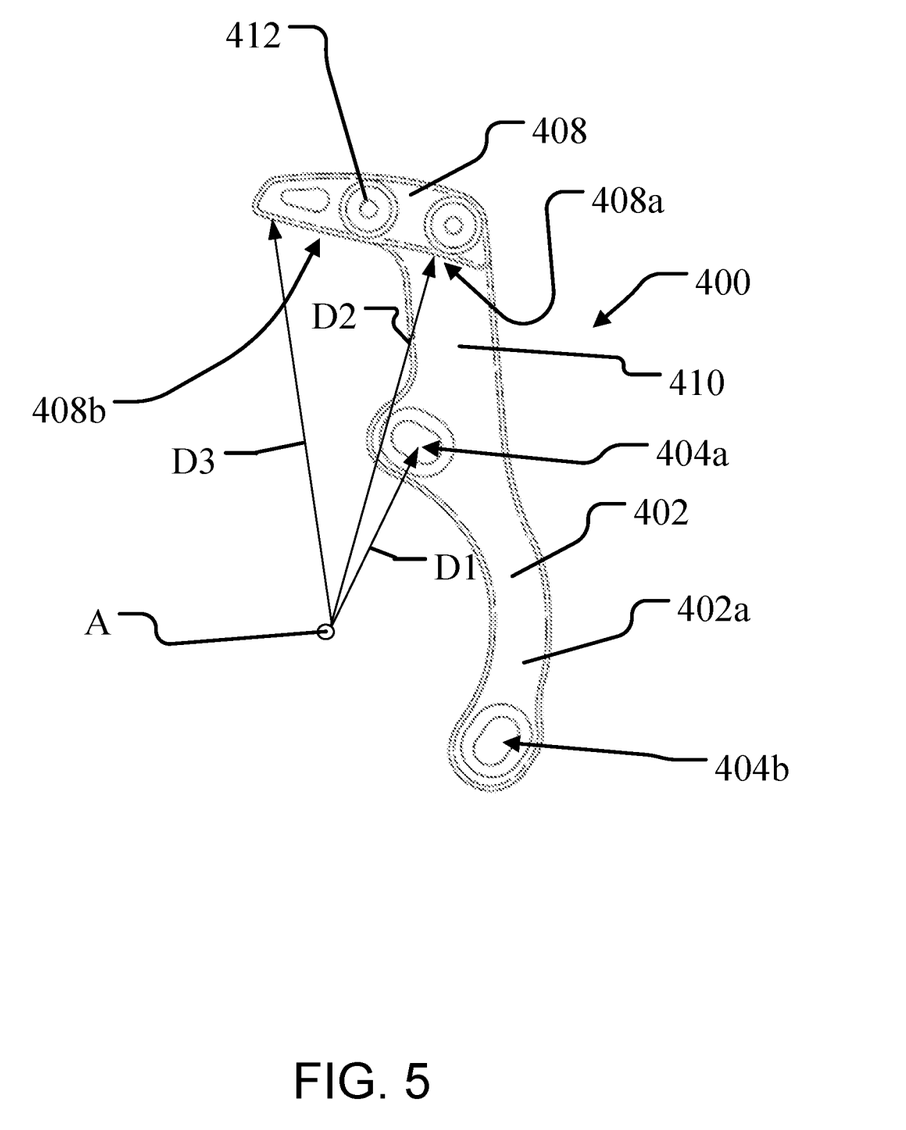
FIG. 5 depicts a side view of another example device for retaining a chain on a sprocket of a bicycle.

FIG. 5 depicts a side view of another example device 400 for retaining a chain on a sprocket of a bicycle. The device 400 is designed primarily to retain a chain on the sprocket, and as such includes only a portion of components depicted in the previous examples. This device 400 may be more appropriate for bicycles that are used in environments where the potential for impact damage to the sprocket from below is less likely (e.g., on a road bike), but where retention of the chain on the sprocket is still desirable. The device 400 includes a base plate 402 that defines a plurality of fastener openings 204 for receiving a plurality of fasteners for securing the base plate 202 to a frame of a bicycle. Here, two fastener openings 204a, 204b are utilized to prevent pivoting of the base plate 202 when installed on the frame. In the depicted configuration, a single spanning portion 202a is located between the first opening 204a and the second opening 204b.

A first, upper guard 208 is secured at an end of an arm 210 of the base plate 202 with a plurality of fasteners 212 such as screw or bolts. In other examples, the upper guard 208 may be secured to the base plate 202 with adhesives. Mechanical fasteners may be more desirable, however, in that they enable the upper guard 208 to be removed and replaced if damaged or worn. The upper guard 208 is disposed on a single side of the plane that defines the base plate 202, as that plane is described above in the context of FIGS. 2A-2B. The upper guard 208 includes two surfaces, a retaining surface 208a, and a guiding surface 208b. The retaining surface 208a is substantially curved along its entire length (in this case, the length of the retaining surface 208a is measured along a direction of travel of a bicycle chain during use, as described in further detail herein). A width of the retaining surface 208a is orthogonal to that direction of chain travel. This curved configuration enables close positioning of the upper guard 208 and a bicycle chain as it travels around a sprocket, thereby reducing or eliminating the possibility of the chain disengaging from the sprocket. The guiding surface 208b is substantially flat along its entire length and width (as length and width are defined above with regard to the retaining surface 208a). In other examples, however, the guiding surface may be curved or slightly curved, e.g., in a direction opposite the direction of curvature of the retaining surface 208a. The flat (or oppositely-curved) configuration of the guiding surface 208b allows the upper guard 208 to guide the chain as it is drawn towards the upper guide surface 208b from the large sprocket at the back wheel, so as to mate efficiently and accurately with the sprocket.

FIG. 5 also depicts positional relationships of various components of a device 300 for retaining a chain on a sprocket. The fastener openings (here represented by fastener opening 304a and 304b) are disposed a first radial distance D1 from the axis A, as required to engage the device 300 with a bicycle frame. The retaining surface 308a are disposed a second radial distance D2 (greater than the first radial distance D1) from the axis A. This second radial distance D2 is consistent along substantially the entire length of the retaining surface 308a, as this maintains tight tolerances with the sprocket, thus retaining the chain thereon. An end of the guiding surface 308b adjacent the retaining surface 308a is also disposed at the second radial distance D2. However, as the guiding surface 308b extends away from the retaining surfaces 308a (so as to guide the chain into and out of contact with the sprocket), the distance to the axis A increases. For example, an end of the guiding surface 308 distal from the guiding surface 308a is disposed a third radial distance D3 from the axis A. The third radial distance D3 is greater than both the first and second radial distances D1, D2 and may be largely dependent on length of the retaining surface 308b and the angle that it projects away from the guiding surface 308a.

Figure 6:
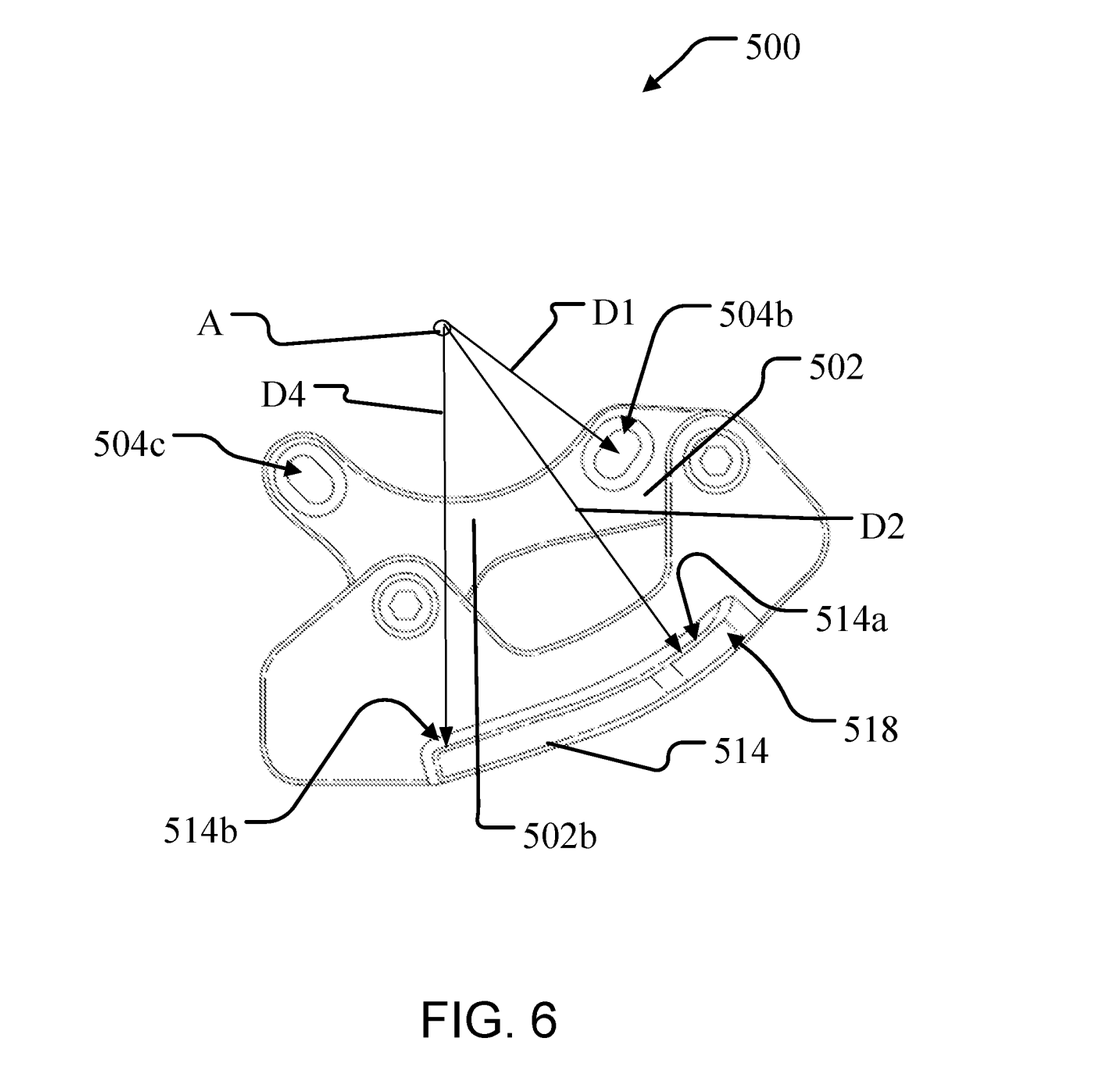
FIG. 6 depicts a side view of another example device for retaining a chain on a sprocket of a bicycle.

FIG. 6 depicts a side view of another example device 500 for retaining a chain on a sprocket of a bicycle. The device 200 includes a base plate 202 that defines a plurality of fastener openings 204 for receiving a plurality of fasteners for securing the base plate 202 to a frame of a bicycle. The base plate 202 includes a single spanning portion 202b between the two openings 204b and 204c. A lower guard 214 is secured at a lower side of the base plate 202 with a plurality of fasteners 216 such as screw or bolts. In other examples, the lower guard 214 may be secured to the base plate 202 with adhesives. Mechanical fasteners may be more desirable, however, in that they enable the lower guard 214 to be removed and replaced if damaged or worn. The lower guard 214 is disposed on both sides of the plane that defines the base plate 202, as that plane is defined above with regard to the device 200 of FIGS. 2A-2B. The lower guard 214 includes two surfaces, a retaining surface 214a, and a guiding surface 214b. The retaining surface 214a is substantially curved along its entire length (in this case, the length of the retaining surface 214a is measured along a direction of travel of a bicycle chain during use, as described in further detail herein). A width of the retaining surface 214a is orthogonal to that direction of chain travel. This curved configuration enables close positioning of the lower guard 214 and a bicycle chain as it travels around a sprocket, thereby reducing or eliminating the possibility of the chain disengaging from the sprocket. The guiding surface 214b is substantially flat along its entire length and width (as length and width are defined above with regard to the retaining surface 214a). In other examples, however, the guiding surface 214b may be curved or slightly curved, e.g., in a direction opposite the direction of curvature of the retaining surface 214a. The flat (or oppositely-curved) configuration of the guiding surface 214b allows the lower guard 214 to guide the chain smoothly away from the lower guard 214 towards the rear derailleur. The lower guard 214 also has an angled leading surface 218 so as to deflect objects away from the lower guard 214, which may help reduce impact force of the object against the lower guard 214, which may regularly come into contact with rocks, roots, logs, etc., on a rugged trail.

FIG. 6 also depicts positional relationships of various components of a device 300 for retaining a chain on a sprocket. The fastener openings (here represented by fastener openings 304b and 304c) are disposed a first radial distance D1 from the axis A, as required to engage the device 300 with a bicycle frame. The retaining surface 314a is disposed a second radial distance D2 (greater than the first radial distance D1) from the axis A. This second radial distance D2 is consistent along substantially the entire length of the retaining surface 314a, as this maintains tight tolerances with the sprocket, thus retaining the chain thereon. Ends of the guiding surface 314b adjacent the retaining surface 314a is also disposed at the second radial distance D2. However, as the guiding surface 314b extends away from the retaining surface 314a (so as to guide the chain into and out of contact with the sprocket), the distance to the axis A increases. For example, an end of the guiding surface 314b distal from the guiding surface 314a is disposed a radial distance (here D4) from the axis A. The distance D4 are largely dependent on a length of the guiding surface 314b, as well as the angle from which it extends from the adjacent retaining surface 314a.

Materials used in the manufacture of the devices described herein may be as required or desired for a particular application. The base plate and spacer plate may be manufactured, for example, from high strength, corrosion resistant materials, such as aluminum, stainless steel, titanium, carbon fiber, etc. The base plate and spacer plate may be formed by casting or tooling, or a combination thereof. The guards are typically formed of plastics displaying desirable properties. For example, it may be desirable that either or both of the upper guard and lower guard are formed from low-friction and/or high impact strength plastics. In an example, the upper plate may be manufactured of low-friction, abrasion-resistant plastic such as UHMW, so as to enable sliding contact between the chain and the guiding surface of the upper guide. The lower guard, on the other hand, may be manufactured of high impact strength plastic such as acetal, nylon, or other types of plastic to resist damage to the sprocket upon impact with rocks, logs, etc. The sizes of the various components, as well as the radial distances described above, may be as required or desired for a particular application, bicycle, sprocket size, etc. In some examples, a second radial distance (e.g., from the sprocket axis to the retaining surfaces) may be about 69.91 mm or about 65.874 mm, depending on the size of the front sprocket. In other examples, the second radial dimension may be about 73.95 mm or about 77.98 mm, depending on the size of the front sprocket. As noted above, the length of the retaining surfaces may be about the length of a link of chain. In other examples, the lengths may be about 0.5 inches, about 0.75 inches, or about 1.0 inches. Other lengths are contemplated.

It is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. It must be noted that, as used in this specification, the singular forms "a," "an," and "the" include plural referents unless the context clearly dictates otherwise.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified examples. In this regard, any number of the features of the different examples described herein may be combined into one single example and alternate examples having fewer than or more than all of the features herein described are possible.

While various examples have been described for purposes of this disclosure, various changes and modifications may be made which are well within the scope contemplated by the present disclosure. Numerous other changes may be made which will readily suggest themselves to those skilled in the art and which are encompassed in the spirit of the disclosure.

What is claimed is:

1. A device for retaining a bicycle chain on a sprocket, the device comprising:
    a base plate defining a plurality of fastener openings centered on an origin, wherein a center of each of the plurality of fastener openings is disposed at a first radial distance from the origin, and wherein the origin defines an axis extending substantially orthogonally from a plane defined by two lines extending from the origin and at least two centers of the centers of the plurality of fastener openings;
    a first guard secured to the base plate and comprising:
        a first guard retaining surface comprising a first curved surface defined by a second radial distance from the axis that is greater than the first radial distance; and
        a first guard guiding surface having a first end adjacent the first guard retaining surface and a second end distal from the first end, wherein the first end is disposed at the second radial distance from the axis, and wherein the second end is disposed at a third radial distance from the axis, wherein the third radial distance is greater than the second radial distance; and
    a second guard secured to the base plate and comprising:
        a second guard retaining surface comprising a second curved surface defined by the second radial distance from the axis; and
        a second guard guiding surface having a first end adjacent the second guard retaining surface and a second end distal from the first end, wherein the first end is disposed at the second radial distance from the axis, and wherein the second end is disposed at a fourth radial distance from the axis, wherein the fourth radial distance is greater than the second radial distance.

2. The device of claim 1, wherein the first guard retaining surface and the second guard retaining surface extend from a first side of the plane, and wherein the device further comprises a spacer plate secured to the base plate on a second side of the plane.

3. The device of claim 1, wherein the first guard comprises a first guard length defined by a length of the first guard retaining surface and a length of the first guard guiding surface, wherein the first guard length is greater than a width of either of the first guard retaining surface and the first guard guiding surface.

4. The device of claim 3, wherein the length of the first guard retaining surface and the length of the first guard guiding surface are each greater than the width of either of the first guard retaining surface and the first guard guiding surface.

5. The device of claim 3, wherein the second guard comprises a second guard length defined by a length of the second guard retaining surface and a length of the second guard guiding surface, wherein the second guard length is greater than a width of either of the second guard retaining surface and the second guard guiding surface.

6. The device of claim 5, wherein the length of the second guard retaining surface and the length of the second guard guiding surface are each greater than the width of either of the second guard retaining surface and the second guard guiding surface.

7. The device of claim 5, wherein the second guard length is greater than the first guard length.

8. The device of claim 1, wherein the base plate comprises a first arm, and wherein the first guard is secured to the first arm, and wherein a distance of a terminus of the first arm from the origin is greater than the second radial distance.

9. The device of claim 1, further comprising a chain guard comprising the second guard and secured to the base plate at a chain guard distance less than the second radial distance.

10. The device of claim 1, wherein the base plate is a substantially d-shaped part.

11. The device of claim 1, wherein the base plate is substantially J-shaped unitary part.

12. The device of claim 11, wherein the base plate comprises a first spanning portion between a first opening and a second opening of the plurality of fastener openings, a second spanning portion between the second opening and a third opening of the plurality of fastener openings, and a gap between the third opening and the first opening of the plurality of fastener openings.

13. The device of claim 1, wherein the base plate is metal and wherein the first guard and the second guard are at least partially plastic.

14. The device of claim 13, wherein the second guard is manufactured of a material having a higher impact strength than a material of the first guard.

15. The device of claim 9, wherein the chain guard comprises a sidewall disposed substantially orthogonal to the second guard retaining surface and a chain exit chamfer surface disposed at an angle to the sidewall.

16. The device of claim 9, wherein the first guard is disposed entirely on a first side of the plane and wherein the chain guard is disposed on the first side of the plane and a second side of the plane.

17. The device of claim 5, wherein the width of the first guard guiding surface is greater than a width of the second guard guiding surface.

18. The device of claim 1, wherein the first guard guiding surface and the second guard guiding surface are substantially flat.

19. The device of claim 1, wherein the first guard retaining surface comprises a first angular arc length and wherein the second guard retaining surface comprises a second angular arc length greater than the first angular arc length.

20. A bicycle comprising the device of claim 1.

* * * * *